US011146854B2

(12) United States Patent
Liu

(10) Patent No.: US 11,146,854 B2
(45) Date of Patent: Oct. 12, 2021

(54) METHOD FOR PLAYING VIDEOS AND ELECTRONIC DEVICE

(71) Applicant: BEIJING DAJIA INTERNET INFORMATION TECHNOLOGY CO., LTD., Beijing (CN)

(72) Inventor: Miao Liu, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/257,126

(22) PCT Filed: Aug. 23, 2019

(86) PCT No.: PCT/CN2019/102281
§ 371 (c)(1),
(2) Date: Dec. 30, 2020

(87) PCT Pub. No.: WO2020/088059
PCT Pub. Date: May 7, 2020

(65) Prior Publication Data
US 2021/0250647 A1 Aug. 12, 2021

(30) Foreign Application Priority Data

Oct. 30, 2018 (CN) .......................... 201811279510.1

(51) Int. Cl.
H04N 21/443 (2011.01)
H04N 21/485 (2011.01)
H04N 21/431 (2011.01)
(52) U.S. Cl.
CPC ..... H04N 21/4438 (2013.01); H04N 21/4312 (2013.01); H04N 21/4858 (2013.01)
(58) Field of Classification Search
CPC ........... H04N 21/4438; H04N 21/4312; H04N 21/4858
(Continued)

(56) References Cited

U.S. PATENT DOCUMENTS 8,789,126 B1\* 7/2014 Nijim ................. H04N 21/4126
725/133
2011/0107220 A1\* 5/2011 Perlman ............... H04N 19/166
715/720
(Continued)

FOREIGN PATENT DOCUMENTS

CN 101702764 A 5/2010
CN 103546821 A 1/2014
(Continued)

OTHER PUBLICATIONS

International search report of PCT application No. PCT/CN2019/102281 dated Nov. 22, 2019.
(Continued)

Primary Examiner — Nathan J Flynn
Assistant Examiner — Caroline Somera
(74) Attorney, Agent, or Firm — Knobbe, Martens, Olson & Bear, LLP

(57) ABSTRACT

A method for playing a video and an electronic device. The method includes: establishing a player adapter, playing a live video stream by a root controller of a first scaled page by using the player adapter; receiving a trigger operation for playing the live video frame on a second scaled page; switching a playing page of the live video stream from the first scaled page to the second scaled page; transmitting the player adapter as a pull stream subject to the second scaled page; and playing the live video stream by a window controller of the second scaled page by using the player adapter for switching the live video stream from the first scaled page to the second scaled page.

18 Claims, 6 Drawing Sheets

(58) Field of Classification Search
USPC .......................................................... 725/37
See application file for complete search history.

(56) References Cited

U.S. PATENT DOCUMENTS

| | | | | |
|---|---|---|---|---|
| 2011/0119586 | A1* | 5/2011 | Blinnikka | G06F 3/0481 |
| | | | | 715/719 |
| 2013/0145412 | A1* | 6/2013 | Perlman | A63F 13/355 |
| | | | | 725/109 |
| 2013/0318429 | A1 | 11/2013 | Movile | |
| 2014/0123013 | A1* | 5/2014 | Lee | G06F 3/0485 |
| | | | | 715/719 |
| 2014/0337147 | A1 | 11/2014 | DaSilva et al. | |
| 2016/0147424 | A1* | 5/2016 | Darby | G06F 3/04845 |
| | | | | 715/716 |
| 2016/0255393 | A1* | 9/2016 | Yu | H04N 21/42216 |
| | | | | 725/37 |
| 2016/0353140 | A1* | 12/2016 | Miller | H04N 21/42684 |
| 2017/0359618 | A1* | 12/2017 | Chen | H04N 21/43615 |
| 2018/0020243 | A1* | 1/2018 | Ni | G11B 27/031 |
| 2020/0197804 | A1* | 6/2020 | Perlman | H04L 65/602 |

FOREIGN PATENT DOCUMENTS

| | | |
|---|---|---|
| CN | 103793170 A | 5/2014 |
| CN | 106028143 A | 10/2016 |
| CN | 106878810 A | 6/2017 |
| CN | 106993214 A | 7/2017 |
| CN | 107092417 A | 8/2017 |
| CN | 108235104 A | 6/2018 |
| CN | 108419117 A | 8/2018 |
| CN | 109451341 A | 3/2019 |

OTHER PUBLICATIONS

First office action of Chinese application No. 201811279510.1 dated Nov. 6, 2019.
Second office action of Chinese application No. 201811279510.1 dated Apr. 3, 2020.
Notification to grant patent right for invention of Chinese application No. 201811279510.1 dated Aug. 5, 2020.

* cited by examiner

METHOD FOR PLAYING VIDEOS AND ELECTRONIC DEVICE

CROSS-REFERENCE TO RELATED APPLICATIONS

This application is a US national stage of international application No. PCT/CN2019/102281, filed on Aug. 23, 2019, which claims priority to Chinese Patent application No. 201811279510.1, filed on Oct. 30, 2018, the disclosure of each of which is herein incorporated by reference in its entirety.

TECHNICAL FIELD

The present application relates to the field of application of computer software, in particular to a video playback method and an electronic device.

BACKGROUND

With the rapid development of the Internet technology and the popularity of smart phones, the ways of entertainment for Internet mobile users are gradually enriched. Live video streaming is a way of entertainment that enriches the life of the Internet mobile users who may watch the excellent shows of the anchor in real time, or have voice chats with the anchor. Nowadays, live video streaming is given more entertainment and social attributes and gradually covers all aspects of life and entertainment of the users.

SUMMARY

In order to overcome the problems in the related art, the present disclosure discloses a video playback method in which a player adapter serves as a pull stream subject to switch a live video stream between a first scaled page and a second scaled page; and a playing page of the live video stream is switched from the first scaled page to the second scaled page in response to a trigger operation for playing the live video stream on the second scaled page. On the second scaled page, a user can browse the content of other pages and make interactions while viewing the live video content, thereby enhancing user experience.

According to a first aspect of the embodiments of the present disclosure, a method for playing a video is provided. The method includes: establishing a player adapter, configured to play a live video stream by a root controller of a first scaled page; receiving a trigger operation for playing the live video stream on a second scaled page; switching a playing page of the live video stream from the first scaled page to the second scaled page; transmitting the player adapter as a pull stream subject to the second scaled page; and playing the live video stream by a window controller of the second scaled page by using the player adapter for switching the live video stream from the first scaled page to the second scaled page.

According to a second aspect of the embodiments of the present disclosure, an apparatus for playing a video is provided. The apparatus includes: a player adapter establishing unit, configured to establish a player adapter; a receiving unit, configured to receive a trigger operation for playing a live video stream on a second scaled page; a page switching unit, configured to switch a playing page of the live video stream from a first scaled page to the second scaled page; and a stream switching unit, configured to play the live video stream by using the player adapter by a root controller of the first scaled page, and transmit the player adapter as a pull stream subject to the second scaled page, wherein a window controller of the second scaled page plays the live video stream by using the player adapter for switching the live video stream from the first scaled page to the second scaled page.

According to a third aspect of the embodiments of the present disclosure, an electronic device is provided. The electronic device includes: a processor; and a memory, configured to store at least one instruction executable by the processor; wherein the at least one instruction, when executed by the processor, causes the processor to perform the method for playing the video.

According to a fourth aspect of the embodiments of the present disclosure, a non-transitory computer-readable storage medium storing at least one instruction therein. The at least one instruction, when executed by a processor of an electronic device, causes the electronic device to perform the method for playing the video.

According to a fifth aspect of the embodiments of the present disclosure, a computer program product including at least one computer program therein is provided. The at least one computer program includes at least one program instruction. The at least one instruction, when executed by a processor of an electronic device, causes the electronic device to perform the method for playing the video.

The technical solutions according to the embodiments of the present disclosure may achieve the following beneficial effects:

The player adapter serves as a pull stream subject to switch the current live video stream between the first scaled page and the second scaled page; and the playing page of the current live video stream is switched from the first scaled page to the second scaled page in response to the trigger operation for playing the current live video stream on the second scaled page. On the second scaled page, a user can browse the content of other pages and make interactions while viewing the live video content, thereby enhancing user experience.

It should be understood that the above general description and the following detailed description are exemplary and explanatory only, and cannot limit the present disclosure.

BRIEF DESCRIPTION OF DRAWINGS

The drawings herein are incorporated into the description and constitute a part of the description, show embodiments that are consistent with the present disclosure, and are used together with the description to explain the principles of the present disclosure.

DESCRIPTION OF EMBODIMENTS

The exemplary embodiments will be described in detail herein, and examples thereof are shown in the accompanying drawings. When the following description refers to the drawings, unless otherwise indicated, the same numbers in different drawings indicate the same or similar elements. The embodiments described therein are not all the embodiments of the present disclosure. On the contrary, these embodiments are simply examples of devices and methods consistent with some aspects of the present disclosure, as detailed in the appended claims.

Figure 1:
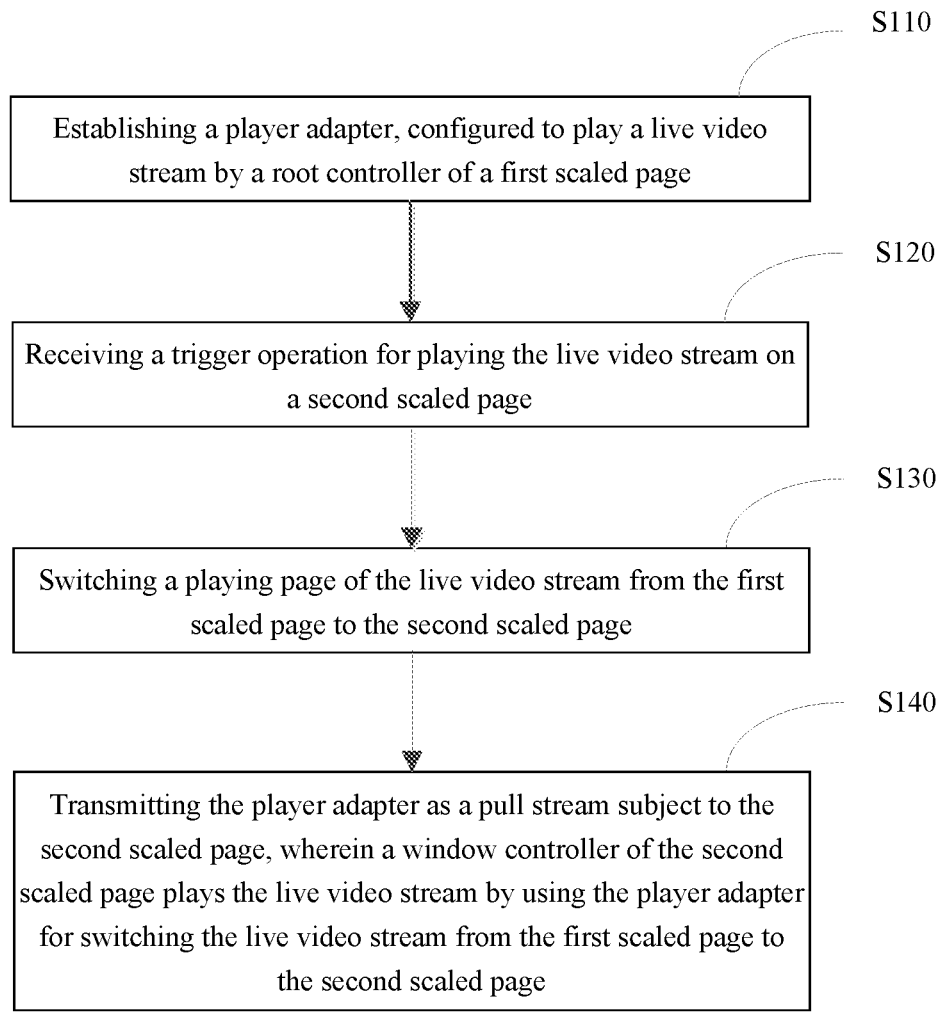
FIG. 1 is a flowchart of a method for playing a video according to an exemplary embodiment.

FIG. 1 is a flowchart of a method for playing a video according to an exemplary embodiment. The method includes the following steps:

In S110, a player adapter is established, and a root controller of the first scaled page plays a live video stream by using the player adapter.

In S120, a trigger operation for playing the live video stream on a second scaled page is received.

In S130, a playing page of the live video stream is switched from the first scaled page to the second scaled page.

In S140, the player adapter is transmitted as a pull stream subject to the second scaled page, and a window controller of the second scaled page playing the live; and a window controller of the second scaled page plays the second page plays the live video stream by using the player adapter for switching the live video stream from the first scaled page to the second scaled page.

In some embodiments, the live video can be viewed in two ways after a user selects the live video to be viewed. After the user enters the first scaled page for playing the live video by default by trigger operations such as clicking the live-streaming room of the live video, a player adapter is established at first, and the root controller of the first scaled page uses the player adapter to play the current live video stream. Then, a trigger operation for playing the current live video stream on the second scaled page. Next, the playing page of the current live video stream is switched from the first scaled page to the second scaled page. Finally, the player adapter is transmitted as a pull stream subject to the second scaled page, and a window controller of the second scaled page plays the current live video stream by using the player adapter for switching the current live video stream from the first scaled page to the second scaled page.

According to the embodiments of the present application, the player adapter serves as a pull stream subject to switch the current live video stream between the first scaled page and the second scaled page; and the playing page of the current live video stream is switched from the first scaled page to the second scaled page in response to the trigger operation for playing the current live video stream on the second scaled page. When the player adapter is on the second scaled page, the user can browse the content of other pages and make interactions while viewing the live video content, thereby enhancing user experience.

Figure 2:
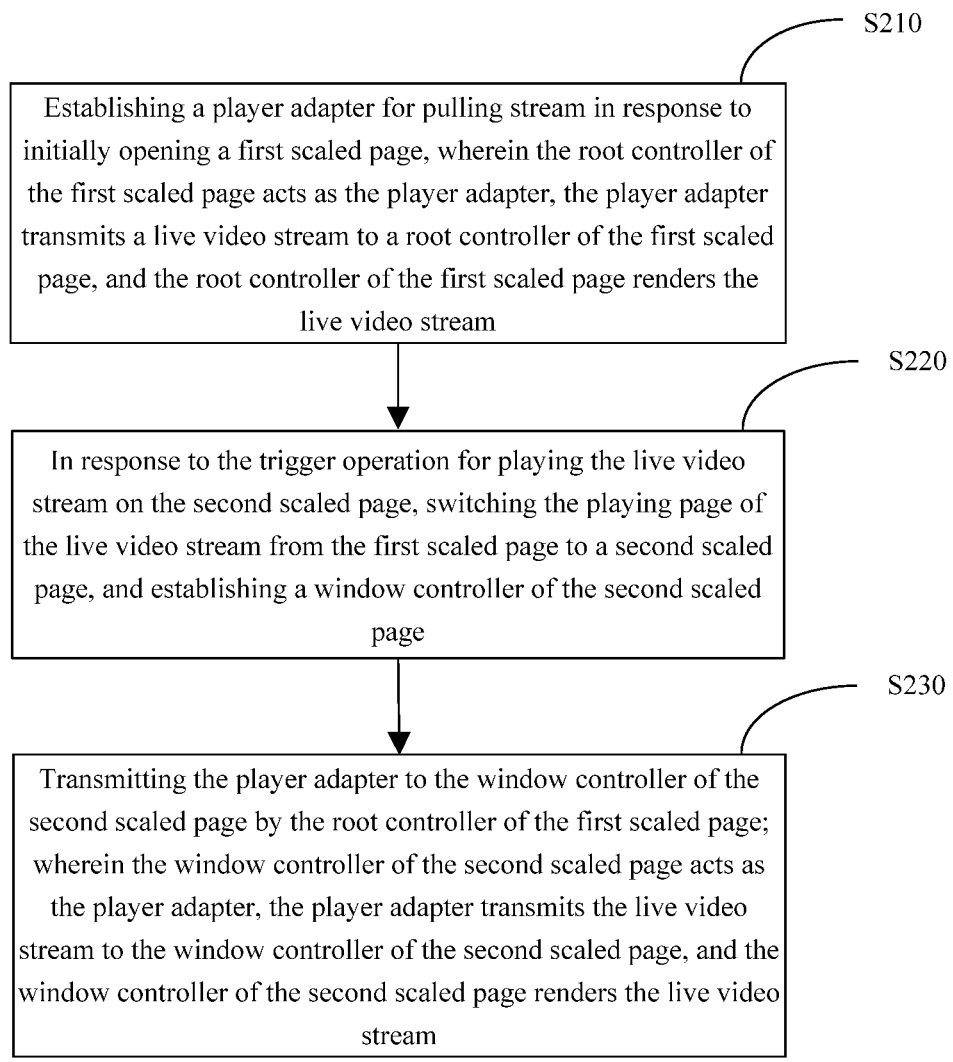
FIG. 2 is a flowchart of a method for playing a video according to an exemplary embodiment.

FIG. 2 is a flowchart of a method for playing a video according to an exemplary embodiment. The method includes the following steps:

In S210, a player adapter for pulling streams is established in response to initially opening a first scaled page; and a root controller of the first scaled page acts as the player adapter.

The player adapter transmits a live video stream to the root controller of the first scaled page; and the root controller of the first scaled page renders the live video stream.

In S220, in response to a trigger operation for playing the live video stream on a second scaled page, a playing page of the live video stream is switched from the first scaled page to the second scaled page, and a window controller of the second scaled page is established.

In S230, the root controller of the first scaled page transmits the player adapter to the window controller of the second scaled page; the window controller of the second scaled page acts as the player adapter; the player adapter transmits the live video stream to the window controller of the second scaled page; and the window controller of the second scaled page renders the live video stream.

In some embodiments, a user enters the first scaled page for playing the live video by default by trigger operations such as clicking the live-streaming room of the live video. Firstly, the player adapter for pulling stream is established in response to initially opening the first scaled page by default; the root controller of the first scaled page acts as the player adapter; the player adapter transmits the current live video stream to the root controller of the first scaled page; and the root controller of the first scaled page renders the current live video stream. Then, the playing page of the current live video stream is switched from the first scaled page to the second scaled page and the window controller of the second scaled page is established, in response to the trigger operation for playing the current live video stream on the second scaled page. Next, the root controller of the first scaled page transmits the player adapter to the window controller of the second scaled page; the window controller of the second scaled page acts as the player adapter; the player adapter transmits the current live video stream to the window controller of the second scaled page; and the window controller of the second scaled page renders the current live video stream.

According to the embodiments of the present disclosure, the player adapter serves as a pull stream subject to switch the current live video stream from the first scaled page to the second scaled page. The root controller of the first scaled page acts as the player adapter, and the root controller of the first scaled page renders the current live video stream. The window controller of the second scaled page acts as the player adapter, and the window controller of the second scaled page renders the current live video stream. The player adapter switches the current live video stream between the first scaled page and the second scaled page to realize automatic continuation of the live-streaming content, maintain the fluency of the live-streaming content and further enhance the user experience. At the same time, it is not necessary to reload the content of the live video stream when the current live video stream is switched between the first scaled page and the second scaled page, which saves data traffic for users.

In some embodiments, the method for switching the playing page of the current live video stream from the first scaled page to the second scaled page is as follows: directly controlling a life cycle and a live-streaming control logic of the second scaled page by the root controller of the first scaled page in order to display the second scaled page upon other pages and ensure that user interactions on other pages are not affected; switching the playing page of the current live video stream from the first scaled page to the second scaled page by the root controller of the first scaled page based on the received trigger operation for playing the current live video stream on the second scaled page.

In some embodiments, the window controller of the second scaled page directly calls the root controller of the first scaled page to perform a life cycle replacement or a live-streaming logic control of the second scaled page, in response to a trigger operation for performing the life cycle replacement or live-streaming control logic of the second scaled page.

In some embodiments, the root controller and the window controller follow the protocols to communicate, after relevant protocols, such as the life cycle replacement of the creating, displaying and closing the second scaled page and the control logic of the playing, pausing and closing the live video stream, are defined in advance. The communication protocols are used between the first scaled page and the second scaled page to transmit the life cycle replacement instructions for the creating, displaying and closing the second scaled page and the control logic instructions for playing, pausing and closing the live video stream. The live-streaming control logic of the second scaled page is provided with the corresponding interface by the second scaled page. Based on the communication protocols, the window controller of the second scaled page transmits the trigger operation instructions for the life cycle replacement or live-streaming control logic of the second scaled page to the root controller of the first scaled page to perform the life cycle replacement or the live-streaming logic control of the second scaled page, in response to the trigger operation for performing the life cycle replacement or live-streaming control logic of the second scaled page. In an embodiment, a user slides the first scaled page to the right to return to other pages, and when the first scaled page disappears, the showFloatingView of the root controller is called through a communication protocol to display the second scaled page. When the user enters a new live-streaming page and closes the current second scaled page, the closeFloatingView of the root controller is called by using a communication protocol to close the second scaled page. Based on the communication protocols, the startPlay, pausePlay and closePlay of the root controller are called to perform the live-streaming control logic of the second scaled page.

According to the embodiments of the present disclosure, the window controller of the second scaled page transmits the trigger operation instruction for the life cycle replacement or live-streaming control logic of the second scaled page to the root controller of the first scaled page based on the communication protocol in order to perform the life cycle replacement or live-streaming logic control of the second scaled page, for facilitating subsequent function expansion, thus improving the performance of the video live-streaming software.

In some embodiments, switching the playing page of the current live video stream from the first scaled page to the second scaled page includes: creating a new page window singleton object which carries and displays the content of the second scaled page; adding the page window singleton object to the first scaled page, such that the root controller of the first scaled page directly controls the life cycle replacement and live-streaming control logic of the page window singleton object; switching the playing page of the current live video stream from the first scaled page to the second scaled page by the root controller of the first scaled page based on the received trigger operation for playing the current live video stream on the second scaled page.

In some embodiments, the life cycle of the second scaled page includes: creating the second scaled page, displaying the second scaled page, and closing the second scaled page.

In some embodiments, the live-streaming control logic of the second scaled page includes: playing the live video stream, pausing the live video stream, and closing the live video stream.

Figure 3:
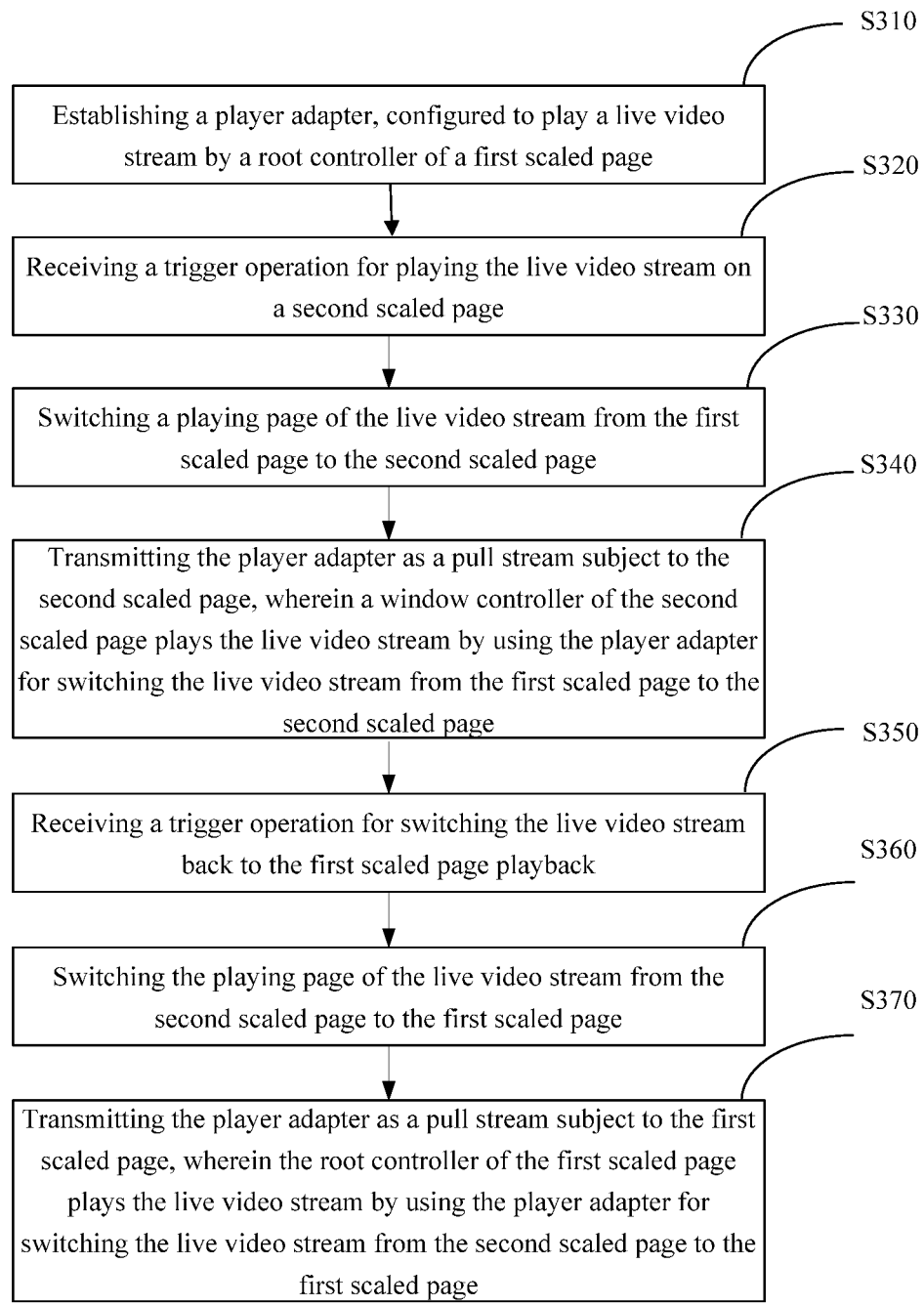
FIG. 3 is a flowchart of a method for playing a video according to an exemplary embodiment.

FIG. 3 is a flowchart of a method for playing a video according to an exemplary embodiment. The method includes the following steps:

In S310, a player adapter is established, and a root controller of a first scaled page plays a live video stream by using the player adapter.

In S320, a trigger operation for playing the live video stream on a second scaled page is received.

In S330, a playing page of the live video stream is switched from the first scaled page to the second scaled page.

In S340, the player adapter is transmitted as a pull stream subject to the second scaled page, and a window controller of the second scaled page plays the live video stream by using the player adapter to play the live video stream for switching the live video stream from the first scaled page to the second scaled page.

In S350, a trigger operation for switching the live video stream back to the first scaled page is received.

In S360, the playing page of the live video stream is switched from the second scaled page to the first scaled page.

In S370, the player adapter is transmitted as a pull stream subject to the first scaled page, and the root controller of the first scaled page plays the live video by using the player adapter for switching the live video stream from the second scaled page to the first scaled page.

In the embodiments of the present disclosure, a player adapter is established at first, and a root controller of a first scaled page plays the current live video stream by using the player adapter, after a user enters the first scaled page for playing the live video by default by a trigger operation such as tapping a live-streaming room of the live video. Then, a trigger operation for playing the current live video stream on a second scaled page is received. Next, a playing page of the current live video stream is switched from the first scaled page to the second scaled page. Then, the player adapter is transmitted as a pull stream subject to the second scaled page, and a window controller of the second scaled page plays the current live video stream by using the player adapter to play the current live video stream for switching the current live video stream from the first scaled page to the second scaled page. Then, a trigger operation for switching the current live video stream back to the first scaled page playback is received, and the playing page of the current live video stream is switched from the second scaled page to the first scaled page. Finally, the player adapter is transmitted as a pull stream subject to the first scaled page, and the root controller of the first scaled page plays the current live video stream by using the player adapter for switching the current live video stream from the second scaled page to the first scaled page.

According to the embodiments of the present disclosure, the player adapter serves as a pull stream subject to switch the current live video stream between the first scaled page and the second scaled page. The root controller of the first scaled page acts as the player adapter, and the root controller of the first scaled page renders the current live video stream. The window controller of the second scaled page acts as the player adapter, and the window controller of the second scaled page renders the current live video stream. The player adapter switches the current live video stream between the first scaled page and the second scaled page to realize automatic continuation of the live-streaming content, maintain the fluency of the live-streaming content and further enhance the user experience.

In some embodiments, the method further includes: disabling the player adapter in response to a trigger operation for closing the first scaled page or the second scaled page by the user.

In some embodiments, the method further includes: receiving a trigger operation for playing the current live video stream by using the first scaled page; and establishing a root controller of the first scaled page.

Figure 4:
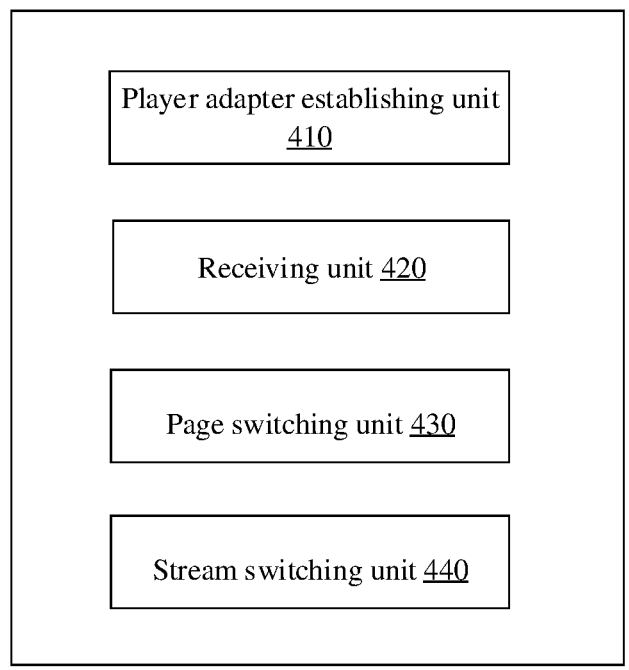
FIG. 4 is a block diagram of an apparatus for playing a video according to an exemplary embodiment.

FIG. 4 is a block diagram of an apparatus for playing a video according to an exemplary embodiment. The apparatus includes: a player adapter establishing unit 410, a receiving unit 420, a page switching unit 430, and a stream switching unit 440.

The player adapter establishing unit 410 is configured to establish a player adapter.

The receiving unit 420 is configured to receive a trigger operation for playing a live video stream on a second scaled page.

The page switching unit 430 is configured to switch a playing page of the live video stream from a first scaled page to the second scaled page.

The stream switching unit 440 is configured to play the live video stream by a root controller of the first scaled page by using the player adapter; and the player adapter is transmitted as a pull stream subject to the second scaled page, and a window controller of the second scaled page plays the current live video stream by using the player adapter for switching the live video stream from the first scaled page to the second scaled page.

In some embodiments, the player adapter establishing unit 410 is configured to establish the player adapter; the receiving unit 420 is configured to receive a trigger operation for playing the current live video stream on the second scaled page; the page switching unit 430 is configured to switch the playing page of the current live video stream from the first scaled page to the second scaled page; and the stream switching unit 440 is configured to play the current live video stream by the root controller of the first scaled page by using the player adapter; and the player adapter is transmitted as a pull stream subject to the second scaled page, and the window controller of the second scaled page plays the current live video stream by using the player adapter for switching the current live video stream from the first scaled page to the second scaled page.

In some embodiments, the receiving unit 420 is further configured to receive the trigger operation for switching the current live video stream back to the first scaled page playback; the page switching unit 430 is further configured to switch the playing page of the current live video stream from the second scaled page to the first scaled page; and the stream switching unit 440 is further configured to transmit the player adapter as a pull stream subject to the first scaled page, and the root controller of the first scaled page plays the current live video stream by using the player adapter for switching the current live video stream from the second scaled page to the first scaled page.

In some embodiments, the player adapter establishing unit 410 is further configured to disable the player adapter in response to a trigger operation for closing the first scaled page or the second scaled page.

In some embodiments, the receiving unit 420 is further configured to receive the trigger operation for playing the current live video stream on the first scaled page.

Figure 5:
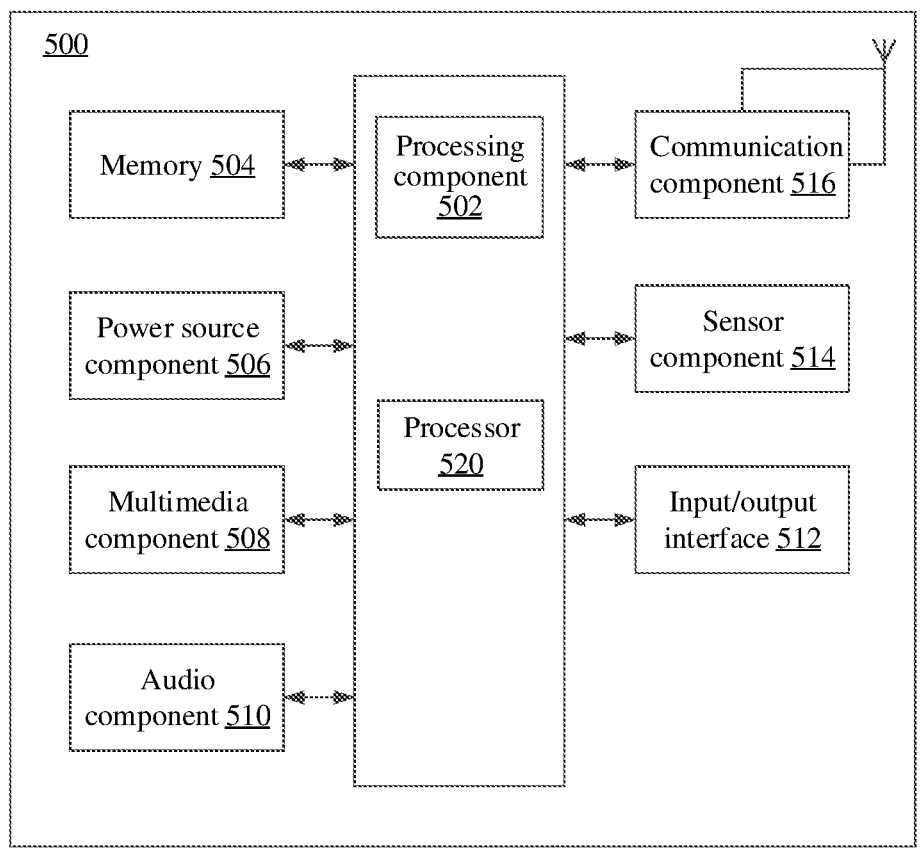
FIG. 5 is a logical block diagram of an electronic device according to an exemplary embodiment.

FIG. 5 is a block diagram showing an electronic device 500 for playing a video using the method for playing the video according to an exemplary embodiment. For example, the electronic device 500 may be a mobile phone, a computer, a digital broadcast terminal, a message transceiver device, a game console, a tablet device, a medical device, a fitness device, a personal digital assistant, and the like.

Referring to FIG. 5, the electronic device 500 may include one or more of: a processing component 502, a memory 504, a power source component 506, a multimedia component 508, an audio component 510, an input/output (I/O) interface 512, a sensor component 514 and a communication component 516.

The processing component 502 typically controls overall operations of the electronic device 500, such as the operations associated with display, telephone calls, data communication, camera operation and recording operation. The processing component 502 may include one or more processors 520 to execute instructions to perform all or part of the steps in the aforementioned methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the electronic device 500. Examples of such data include instructions for any applications or methods operated on the electronic device 500, contact data, phonebook data, messages, pictures, video, and the like. The memory 504 may be implemented by any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power source component 506 provides power for various components of the electronic device 500. The power source component 506 may include a power management system, one or more power sources, and any other components associated with the generation, management, and distribution of power in the electronic device 500.

The multimedia component 508 includes a screen providing an output interface between the electronic device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensors may not only sense the boundary of the touch or slide action, but also detect the duration and pressure associated with the touch or slide action. In some embodiments, the multimedia component 508 includes a front camera and/or a rear camera. The front camera and the rear camera may receive the external multimedia data while the electronic device 500 is in operation mode, such as photographing mode or video mode. Each of the front camera and the rear camera may be a fixed optical lens system or may have the capabilities of focal length and optical zoom.

The audio component 510 is configured to output and/or input audio signals. For example, the audio component 510 includes a microphone (MIC) configured to receive an external audio signal when the electronic device 500 is in operation mode, such as call mode, recording mode, and voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the electronic device 500. For instance, the sensor component 514 may detect the on/off status of the electronic device 500, the relative positioning of components, such as the display and the keypad of the electronic device 500. The sensor component 514 may further detect the change in position of the electronic device 500 or a component of the electronic device 500, the presence or absence of user contact with the electronic device 500, the position or the acceleration/deceleration of the electronic device 500, and the change in temperature of the electronic device 500. The sensor component 514 may include a proximity sensor configured to detect the presence of nearby objects without any physical contact. The sensor component 514 may further include a light sensor, such as a complementary metal oxide semiconductor (CMOS) or a charge coupled device (CCD) image sensor, for the use of imaging applications. In some embodiments, the sensor component 514 may further include an accelerometer sensor, a gyroscope sensor, a magnetic sensor, a pressure sensor, or a temperature sensor.

The communication component 516 is configured to facilitate wired or wireless communication between the electronic device 500 and other devices. The electronic device 500 can access a wireless network based on a communication standard, such as Wi-Fi, operator networks (such as 2G, 3G, 4G or 5G) or a combination thereof. In one exemplary embodiment, the communication component 516 receives a broadcast signal or broadcast-related information from an external broadcast management system via a broadcast channel. In one exemplary embodiment, the communication component 516 further includes a near-field communication (NFC) module to facilitate short-range communications. For example, the NFC module may be implemented based on the radio frequency identification (RFID) technology, the infrared data association (IrDA) technology, the ultrawideband (UWB) technology, the Bluetooth (BT) technology, and other technologies.

In some embodiments, the electronic device 500 may be implemented by one or more application specific integrated circuits (ASICs), digital signal processors (DSPs), digital signal processing devices (DSPDs), programmable logic devices (PLDs), field-programmable gate array (FPGA), controllers, microcontrollers, microprocessors or other electronic components to execute the aforementioned methods.

An exemplary embodiment further provides a non-transitory computer-readable storage medium including instructions, such as the memory 504 including the instructions executable by a processor 520 in the electronic device 500 to perform the above methods. For example, the non-transitory computer-readable storage medium may be an ROM, a random access memory (RAM), a compact disc read-only memory (CD-ROM), a magnetic tape, a floppy disk, an optical data storage device, and the like.

Figure 6:
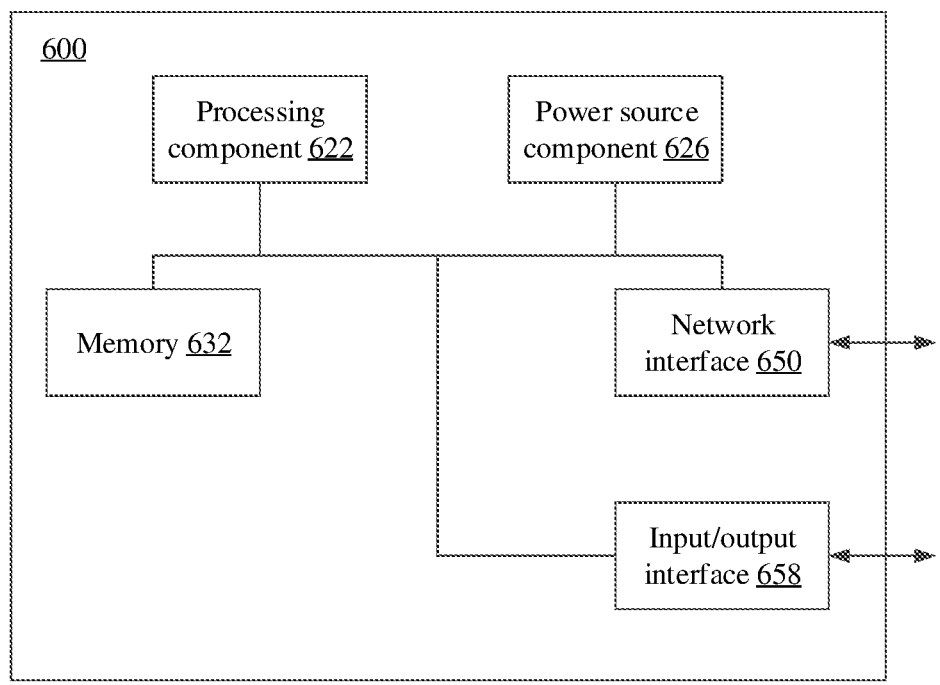
FIG. 6 is a logical block diagram of another electronic device according to an exemplary embodiment.

FIG. 6 is a block diagram showing an electronic device 600 for playing a video using the method for playing the video according to an exemplary embodiment. For example, the electronic device 600 may be provided as a server. Referring to FIG. 6, the electronic device 600 includes a processing component 622 which further includes one or more processors, and memory resources represented by a memory 632 for storing instructions executable by the processing component 622, for example an application program. The application program stored in the memory 632 may include one or more modules each corresponding to a set of instructions. Furthermore, the processing component 622 is configured to execute instructions to perform the method for playing a video.

The electronic device 600 may further include a power source component 626 configured to perform power source management of the electronic device 600, a wired or wireless network interface 650 configured to connect the electronic device 600 to the network, and an input/output (I/O) interface 658. The electronic device 600 can operate an operating system stored in the memory 632, such as Windows Server™, Mac OS X™, Unix™, Linux™, FreeBSD™ or the like.

Other embodiments of the present disclosure will be apparent to those skilled in the art from consideration of the specification and practice the present disclosure herein. This application is intended to cover any variations, uses, or adaptations of the present disclosure, following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for playing a video, comprising:
   establishing a player adapter, configured to play a live video stream by a root controller of a first scaled page;
   receiving a trigger operation for playing the live video stream on a second scaled page;
   switching a playing page of the live video stream from the first scaled page to the second scaled page by the root controller of the first scaled page based on the received trigger operation for playing the live video stream on the second scaled page;
   transmitting the player adapter as a pull stream subject to the second scaled page; and
   playing the live video stream by a window controller of the second scaled page by using the player adapter for switching the live video stream from the first scaled page to the second scaled page,
   wherein the root controller is configured to:
      directly control a life cycle and a live-streaming control logic of the second scaled page, wherein the life cycle of the second scaled page comprises creating the second scaled page, displaying the second scaled page, and closing the second scaled page and the live-streaming control logic of the second scaled page comprises playing the live video stream, pausing the live video stream, and closing the live video stream.

2. The method according to claim 1, further comprising:
   establishing the player adapter for pulling streams in response to initially opening the first scaled page;
   acting, by the root controller of the first scaled page, as the player adapter;
   transmitting, by the player adapter, the live video stream to the root controller of the first scaled page; and rendering, by the root controller of the first scaled page, the live video stream.

3. The method according to claim 2, further comprising:
in response to the trigger operation for playing the live video stream on the second scaled page, switching the playing page of the live video stream from the first scaled page to the second scaled page and establishing the window controller of the second scaled page.

4. The method according to claim 3, further comprising:
transmitting, by the root controller of the first scaled page, the player adapter to the window controller of the second scaled page;
acting, by the window controller of the second scaled page, as the player adapter;
transmitting, by the player adapter, the live video stream to the window controller of the second scaled page; and
rendering, by the window controller of the second scaled page, the live video stream.

5. The method according to claim 1, further comprising:
in response to a trigger operation for a life cycle replacement or the live-streaming control logic, performing, by the window controller of the second scaled page, the life cycle replacement or the live-streaming control logic of the second scaled page by directly calling the window controller of the second scaled page.

6. The method according to claim 1, further comprising:
in response to a trigger operation for a life cycle replacement or the live-streaming control logic, transmitting, by the window controller of the second scaled page, an instruction of the trigger operation for the life cycle replacement or the live-streaming control logic of the second scaled page to the root controller of the first scaled page based on a communication protocol, to perform the life cycle replacement or the live-streaming control logic of the second scaled page.

7. The method according to claim 6, wherein the communication protocol is a communication protocol between the first scaled page and the second scaled page.

8. The method according to claim 4, wherein switching the playing page of the live video stream from the first scaled page to the second scaled page comprises:
creating a new page window singleton object which carries and displays the second scaled page;
adding the new page window singleton object to the first scaled page, such that the root controller of the first scaled page directly controls a life cycle and a live-streaming control logic of the new page window singleton object; and
switching the playing page of the live video stream from the first scaled page to the second scaled page by the root controller of the first scaled page based on the received trigger operation for playing the live video stream on the second scaled page.

9. The method according to claim 5, further comprising:
receiving a trigger operation for switching the live video stream back to the first scaled page;
switching the playing page of the live video stream from the second scaled page to the first scaled page;
transmitting the player adapter as a pull stream subject to the first scaled page; and
playing the live video stream by the root controller of the first scaled page by using the player adapter for switching the live video stream from the second scaled page to the first scaled page.

10. The method according to claim 9, further comprising:
disabling the player adapter in response to a trigger operation for closing the first scaled page or the second scaled page.

11. The method according to claim 10, further comprising:
receiving a trigger operation for playing the live video stream on the first scaled page; and
establishing the root controller of the first scaled page.

12. An electronic device, comprising:
a processor; and
a memory configured to store at least one instruction executable by the processor,
wherein the at least one instruction, when executed by the processor, causes the processor to perform a method comprising:
establishing a player adapter, configured to play a live video stream by a root controller of a first scaled page;
receiving a trigger operation for playing the live video stream on a second scaled page;
switching a playing page of the live video stream from the first scaled page to the second scaled page by the root controller of the first scaled page based on the received trigger operation for playing the live video stream on the second scaled page;
transmitting the player adapter as a pull stream subject to the second scaled page; and
playing the live video stream by a window controller of the second scaled page by using the player adapter for switching the live video stream from the first scaled page to the second scaled page,
wherein the root controller is configured to:
directly control a life cycle and a live-streaming control logic of the second scaled page, wherein the life cycle of the second scaled page comprises creating the second scaled page, displaying the second scaled page, and closing the second scaled page and the live-streaming control logic of the second scaled page comprises playing the live video stream, pausing the live video stream, and closing the live video stream.

13. A non-transitory computer-readable storage medium storing at least one instruction therein, wherein the at least one instruction, when executed by a processor of an electronic device, causes the electronic device to perform a method comprising:
establishing a player adapter, configured to play a live video stream by a root controller of a first scaled page;
receiving a trigger operation for playing the live video stream on a second scaled page;
switching a playing page of the live video stream from the first scaled page to the second scaled page by the root controller of the first scaled page based on the received trigger operation for playing the live video stream on the second scaled page;
transmitting the player adapter as a pull stream subject to the second scaled page; and
playing the live video stream by a window controller of the second scaled page by using the player adapter for switching the live video stream from the first scaled page to the second scaled page,
wherein the root controller is configured to:
directly control a life cycle and a live-streaming control logic of the second scaled page, wherein the life cycle of the second scaled page comprises creating the second scaled page, displaying the second scaled page, and closing the second scaled page and the live-streaming control logic of the second scaled page comprises playing the live video stream, pausing the live video stream, and closing the live video stream.

14. The electronic device according to claim 12, wherein the method further comprises:
- establishing the player adapter for pulling streams in response to initially opening the first scaled page;
- acting, by the root controller of the first scaled page as the player adapter;
- transmitting, by the player adapter, the live video stream to the root controller of the first scaled page; and
- rendering, by the root controller of the first scaled page, the live video stream.

15. The electronic device according to claim 14, wherein the method further comprises:
- in response to the trigger operation for playing the live video stream on the second scaled page, switching the playing page of the live video stream from the first scaled page to the second scaled page and establishing the window controller of the second scaled page.

16. The electronic device according to claim 15, wherein the method further comprises:
- transmitting, by the root controller of the first scaled page, the player adapter to the window controller of the second scaled page;
- acting, by the window controller of the second scaled page as the player adapter;
- transmitting, by the player adapter, the live video stream to the window controller of the second scaled page; and
- rendering, by the window controller of the second scaled page, the live video stream.

17. The electronic device according to claim 12, wherein the method further comprises:
- in response to a trigger operation for a life cycle replacement or the live-streaming control logic, performing, by the window controller of the second scaled page, the life cycle replacement or the live-streaming control logic of the second scaled page by directly calling the root controller of the first scaled page.

18. The electronic device according to claim 12, wherein the method further comprises:
- in response to a trigger operation for a life cycle replacement or the live-streaming control logic, transmitting, by the window controller of the second scaled page, an instruction of the trigger operation for the life cycle replacement or the live-streaming control logic of the second scaled page to the root controller of the first scaled page to perform the life cycle replacement or the live-streaming control logic of the second scaled page.

* * * * *